United States Patent Office.

ORAZIO LUGO, OF BALTIMORE, MARYLAND.

Letters Patent No. 102,689, dated May 3, 1870.

IMPROVEMENT IN THE MANUFACTURE OF FERTILIZERS AND OIL FROM FISH.

The Schedule referred to in these Letters Patent and making part of the same.

Be it known that I, ORAZIO LUGO, of the city and county of Baltimore, State of Maryland, have invented certain new and useful Improvements in the Manufacture of Fertilizers and Oil from Fish; and I do hereby declare that the following is a specification.

The object of this invention is to retain, bind, and utilize the nitrogenous substances contained in fish by means of chemical agents, such as sulphuric acid, hydrochloric acid, nitric acid, pyroligneous acid, or any of the acid salts, as the salt cake of commerce, or their equivalents, either during the process of extracting the oil, or the process in which the fish is converted into a fertilizer or guano, in the manner hereafter specified.

In order to understand the importance of this invention, it will be necessary to describe briefly the process usually adopted by the manufacturer of fish-oil and fish-guano, and also the investigations I have made on such and similar processes.

The fish, as soon as it is brought to the factory, is boiled, steamed, or cooked for a time varying from three to thirty minutes, in as little water as possible. It is then removed from the vessel and allowed to drain. It is now pressed, in order to deprive it of the liquid substances it contains.

The latter, and those liquids obtained in draining the cooked fish, are conveyed into vats or tanks. If the fish contained any oil, it will be found on the surface of said liquid, from which it is separated or removed. The remaining watery liquid, on account of its rapidly becoming putrid, is generally thrown away or imperfectly utilized.

I have found that, during the above-described process, a considerable loss of volatile alkalies is sustained, besides a loss of solid nitrogenous compounds.

The volatile alkalies begin to escape while the fish is being boiled or steamed, even if the fish be perfectly fresh, and also during all of the subsequent manipulations, but more especially from the watery liquid obtained in draining and pressing the boiled or steamed fish, as the said watery liquid contains the highest nitrogenous compounds of the fish.

The following is a description of my process:

The fish is boiled or steamed for any desired length of time in acid solutions, or in solutions of acid salts, in a suitable vessel, from which vessel the fish is removed (after having been sufficiently cooked) and drained or pressed.

The liquors and oil resulting from the draining and pressing are conveyed into vats or caldrons. After some hours rest the oil of the fish will be found on the surface of said liquors, from which it is separated or removed, and the watery liquors resulting from the boiling, steaming, or cooking, and draining or pressing of the fish are concentrated by evaporating the water, and otherwise used for similar purposes, as specified in Letters Patent of the United States allowed to me March 25, 1870.

The fish-scraps or pomace may be dried either by artificial means, or slowly, at ordinary temperature, without incurring any loss of volatile alkalies, as putrefaction will not set in when treated with acid or acid-salt solution, as above described.

It is evident that, by using my process, there can be little or no loss of ammoniacal compounds as long as the liquors and fish-scraps or pomace are kept acid.

I am aware that it has been proposed the use of acids in the manufacture of animal manures; but

What I claim as my invention, and desire to secure by Letters Patent of the United States, is—

The boiling, steaming, or cooking of fish in acid or acid-salt solution, for the purpose and in the manner herein described.

ORAZIO LUGO.

Witnesses:
EDM. F. BROWN,
WM. H. BRERETON.